United States Patent Office 2,940,937
Patented June 14, 1960

2,940,937
FLUORESCENT PRINTING INK

Samuel J. O'Brien, Dunellen, N.J., assignor to American Cyanamid Company, New York, N.Y., a corporation of Maine No Drawing. Filed Apr. 29, 1954, Ser. No. 426,600

2 Claims. (Cl. 252—301.2)

This invention relates to printing inks. More particularly, it relates to fluorescent printing inks. Still more particularly, it relates to fluorescent printing inks especially adapted for use in high speed printing operations.

Recently, the use of organic fluorescent dyestuffs in various fields has received wide attention. One such field is printing inks. Various methods have been proposed for employing such dyestuffs in printing inks. One method comprises forming a fluorescent ink, comprising the organic fluorescent dyestuff, a thermosetting resinous material in pigment form and a suitable vehicle. This method involves polymerizing and curing the resinous material, followed by grinding of the polymerized mass to a powder. The desired organic fluorescent dyestuff may be incorporated during grinding of the polymerized mass or it may be added directly to the monomer. In either event, the resultant pigment is incorporated into a suitable vehicle by milling.

Although printing inks suitable for various purposes have been prepared in this manner, they have not been satisfactory for use in high speed printing operations. One reason is that the polymerized product is a glass-like solid mass and must be ground and classified. Even with the aid of the most advanced grinding equipment, it has not been possible to reduce the thermosetting glass-like solid to particles within a size range of about 0.01 to 1.0 micron as required for satisfactory high speed printing inks. Even when mechanically reduced to as small as possible, the size is not uniform and may vary from one micron to as high as about 10 microns. Prints obtained from high speed printing operations in which such printing inks are employed are mottled in appearance and rub off and smear even after several months.

It has also been proposed to employ inks for high speed printing operations comprising a suitable vehicle and a pigment composed of a thermoplastic polymer colored with an organic fluorescent dye. These inks have an advantage in that the polymer thereof may be formed into a powder of the necessary pigment size for use in high speed printing operations by a process of emulsion polymerization. They have the disadvantage that while inks made with certain vehicles exhibit maximum fluorescence and desirability of shade when deposited as a film, inks prepared with other vehicles result in films having little fluorescence and an undesirable shade. Because of the failure to control color shifts and loss of fluorescence it has been necessary to restrict the vehicle employed in such inks. Unfortunately, most of the vehicles which can be employed satisfactorily are those which presently are not generally used in high speed letter press and lithographic printing.

There has remained, therefore, a continued demand for a fluorescent printing ink which may be successfully employed in high speed printing operations. Such a printing ink should be free of the various disadvantages noted above. It should comprise a pigment having an average number particle size between about 0.01 and 1.0 micron. It should be capable of transfering as thin films from the printing plate or roll to the paper or other material to which application is made. Films so produced should have good adhesion to the base applied and be resistant to rubbing off and/or smearing. Moreover, the shade and intensity of fluorescence should be controllable as desired in the printed film and should be obtainable with all printing ink vehicles, particularly those used in high speed letter press and lithographic printing operations.

It is an object of this invention to provide an organic fluorescent printing ink having these various characteristics. In addition, it is a further object of this invention to provide a process for preparing such fluorescent printing inks. It has been found, in accordance with this invention, that fluorescent printing inks having the desired characteristics may be obtained by combining a resinous material in pigment form with the desired organic fluorescent dye and desired vehicle. Inks so prepared are, to a surprising degree, substantially free from the above described objections and limitations.

The resinous material employed in the printing inks of this invention is a composite product. It is formed by combining a thermoplastic polymer as a base, preferably vinyl-vinylidene chloride copolymer or polyacrylonitrile of pigment particle size in aqueous dispersion with a resinous forming monomer and subjecting the mixture to polymerization.

The thermoplastic polymer employed in the formation of the printing inks of this invention may be quite widely varied. The monomer from which it is formed may be any vinyl type compound which can be polymerized or copolymerized by a process of emulsion polymerization. For example, the thermoplastic polymer may be a polymer or copolymer comprising vinyl chloride, vinylidene chloride, acrylonitrile, styrene, methylacrylate, acrylic acid, maleic anhydride and the like.

When polymerization is conducted in the presence of a small amount of an anionic surface active agent, the thermoplastic polymer may be obtained in varying particle sizes. The particles of any particular polymerization may be obtained in uniform size even as exceedingly fine particles of 0.01 micron. These particles, moreover, are spherical or globular and of substantially uniform size rendering them particularly suitable for use in preparation of free flowing inks necessary for high speed printing operations.

The thermoplastic polymer so produced in the desired particle size of about 0.01 to about 1 micron is then combined with a resinous forming monomeric material. This may be conveniently done by adding an aqueous solution of the monomeric material to an aqueous dispersion of the thermoplastic polymer. Polymerization of the added monomer is then effected in a conventional manner by use of temperature and catalyst.

The added monomeric material may be quite widely varied. For example, those monomers which form thermosetting resins such as the reaction products of formaldehyde with urea, melamine, ketones, phenols and their derivatives may be employed. Monomeric materials, which form thermoplastic resinous materials may also be employed. For instance, any vinyl type polymer forming material such as, for instance, methylmethacrylate, methacrylic acid, acrylonitrile and the like may be successfully employed. It is also possible to treat the thermoplastic powdered polymer with mixtures of various monomeric materials. Thus two or more thermoplastic or thermosetting resinous forming monomers may be employed.

While any of the above described monomers and mixtures of monomers result in colorless pigments adapted for successful use in fluorescent printing inks, the most satisfactory inks have been obtained employing a pigment comprising a thermoplastic polymer treated with a thermosetting resinous forming monomer.

The amount of monomeric resinous forming material which may be added to the dispersion of thermoplastic particles may be quite widely varied. In general, as little as 1.5% of monomer based on the weight of thermoplastic polymer may be employed. Excellent fluorescent printing inks are obtained when the monomer comprises as high as 65% by weight of the thermoplastic material. Proportions as high as 85% by weight of monomer and even higher may be employed, although beyond about 65% there is no added advantage gained, particularly since a second solid phase of the polymerized added monomer begins to appear.

After the composite resinous pigment material has been formed, it is separated, washed and dried. A vehicle suitable for use in high speed printing operations is then combined with the preferred fluorescent organic dyestuff. To this is added the colorless resinous pigment and the entire mixture subjected to a milling operation.

As pointed out, one of the advantages of this invention is that the new fluorescent printing inks thereof may comprise any of the vehicles commonly employed in the manufacture of high speed printing inks. Such vehicles, for instance, are lithographic varnish (bodied linseed oil), maleic acid, fumaric acid-rosin adducts in glycols, metal rosinates such as zinc rosinate in hydrocarbon solvents such as kerosene, shellac in alcohol, and the like.

While a great many fluorescent organic dyestuffs are well known, the substances of interest herein have absorption bands in the spectral region adjoining the short-wave limit of the fluorescent emission band, and sometimes overlapping this band. As examples of those types of fluorescent organic dyes which are of interest herein are Rhodamine B (C.I. 749), Rhodamine 6G (C.I. 752), Yellow H-E-B and the like. It is also possible to prepare daylight fluorescent printing inks and black light fluorescent printing inks by a proper selection of dyes. Daylight fluorescent inks are those whose fluorescent emission occurs in the same wave length region as the dominant wave band of the dye. Black light fluorescent inks are those which are neutral in daylight but which may be excited to fluorescence by ultraviolet radiation. When mixing fluorescent dyes it is essential that the fluorescent emission band of one does not fall within the region of spectral absorption of the others. This may be avoided by proper selection of the dyes. Proper proportioning will also tend to minimize this effect.

Fluorescence of the dyes of the type concerned herein depends upon their being in a satisfactory physical and chemical condition to fluoresce. For example, it is known that the fluorescence of Rhodamine B decreases with concentration. Accordingly, approximately the correct amount must be present under the proper conditions. Fluorescence also depends upon the state of aggregation of the dye or on the electronic state of the dye in the medium. For example, a saturated solution of Rhodamine B in xylene is blue and non-fluorescent. A solution of Rhodamine B in acetone at a concentration of the same order, about $10^{-5}M$, as the saturated solution in xylene is yellow-red and vividly fluorescent in daylight as well as ultraviolet light. In these two solutions Rhodamine B is in different states indicated by different absorption spectra. In the inks, the dye must be obtained in a state similar to that in acetone. The degree of fluorescence may also be altered by the presence of other coloring material. For example, fluorescence of Rhodamine B is reduced markedly when blue dyes are present.

Preparation of fluorescent inks according to this invention may be further demonstrated by the following examples. These examples are intended to be illustrative only and not by way of limitation. All parts are by weight unless otherwise noted.

Example 1

18 parts of methylolurea dissolved in 300 parts of water, was added to 400 parts of a dispersion containing 20 parts of polyacrylonitrile solids of 0.16 micron number average particle diameter and the temperature raised to 80° C. To this was added 5 parts of concentrated hydrochloric acid, heating continued until the temperature reached 90° C. and then discontinued and the temperature allowed to return to room temperature. The resultant white pigment was separated, washed and dried at 50° C.

Example 2

The procedure of Example 1 was repeated substituting 15 parts of methyl methacrylate for the methylolurea and adding 0.2 part of benzoyl peroxide. A white pigment was again separated, washed and dried at 50° C.

Example 3

To a solution of one part Teglac resin 127 and one part diethylene glycol was added 0.005 part of Rhodamine B (C.I. 749) and 0.005 part of Rhodamine 6G (C.I. 752). To this solution was added 1 part of the white pigment produced in accordance with Example 1 and the mixture milled in conventional apparatus to produce a fluorescent printing ink suitable for use in letter press printing. The consistency of this fluorescent ink may be readily varied by varying the proportion of Teglac resin to diethylene glycol.

Example 4

The procedure of Example 3 was repeated using 1 part Epon resin 1001, 0.6 part xylol and 0.4 part butanol in place of the Teglac resin 127 and diethylene glycol. The resulting ink was highly suitable for letter press printing, giving films of bright red exhibiting daylight fluorescence.

Example 5

The procedure of Example 3 was again repeated substituting 2 parts of a No. 1 transparent lithographic varnish and two parts denatured ethanol for the Teglac resin and diethylene glycol. The Rhodamine B and Rhodamine 6G were dissolved in the ethanol and the solution incorporated into the lithographic varnish vehicle. When used in high speed printing a pleasing shade of red is obtained exhibiting daylight fluorescence and being highly resistant to rubbing and smearing.

Example 6

The procedure of Example 3 was again repeated substituting 1 part of the white pigment prepared according to Example 2 for the pigment of Example 1. Again an ink giving a bright red printed film exhibiting daylight fluorescence was obtained.

Example 7

The procedure of Example 4 was repeated substituting the pigment of Example 2 for the pigment of Example 1. A similar ink was obtained exhibiting daylight fluorescence films prepared by high speed printing.

Example 8

The procedure of Example 5 was repeated substituting the white pigment of Example 2 for the white pigment of Example 1. Again a highly satisfactory high speed printing was obtained resulting in a film having maximum daylight fluorescence and being resistant to rubbing and smearing.

Example 9

18 parts of methylol urea dissolved in 300 parts of water was added to 100 parts of an aqueous dispersion containing 35 parts of a vinyl-vinylidine chloride copolymer of 0.05 micron number average particle size. To this was added 2 parts Arquad 18 and the mixture stirred 30 minutes at room temperature. Then 5 parts of 36% hydrochloric acid was added and the temperature raised to 90° C., heating discontinued and the mixture allowed to return to room temperature spontaneously. After filtering, washing and drying a soft white powder was obtained.

Example 10

Three inks having the composition indicated in the following table were prepared.

| Materials | Inks | | |
|---|---|---|---|
| | A, parts | B, parts | C, parts |
| Pigment of Example 9 | 1 | 1 | 1 |
| Vehicle of Example 3 | 3 | | |
| Heat-Set Vehicle (a) | | 3 | |
| Lithographic Varnish | | | 3 |
| Ethyl Alcohol | | 0.05 | |
| Rhodamine B | 0.015 | 0.015 | 0.015 | a A limed rosinate (50%) in kerosene (50%).

The inks were made by milling the above materials on an ink mill or automatic muller. In each case brightly fluorescent red inks were obtained which produced smooth films at very small film thicknesses.

Example 11

30 parts urea, 26 parts triethanolamine, 20.5 parts diallylmelamine and 160 parts 37% aqueous formaldehyde solution were mixed at room temperature in a flask fitted with a thermometer, stirrer and reflux condenser. The resulting clear solution was heated to reflux (78° C.), held at this temperature for 10 minutes, cooled to 20° C. and the resultant resinous forming material added to 140 parts of a vinyl vinylidine chloride copolymer of 0.25 micron number average particle size, dispersed in 2000 parts of water. Hydrochloric acid (36%) was added to bring the pH to about 2, the mixture heated to 80° C. and held at that temperature for 1 hour. After cooling, filtering, washing and drying a soft white powder was obtained. This powder was used in the preparation of fluorescent printing inks as indicated in the following examples.

Example 12

An ink containing 1 part Rhodamine BX, 100 parts of the white pigment of Example 11 and 200 parts of the vehicle of Example 3 was prepared by milling. The resulting ink gave bright red highly fluorescent films when used in high speed printing.

Example 13

Example 12 was repeated using 2 parts of Rhodamine BX. The resulting ink gave prints similar to those obtained with the ink of Example 12 except that the color was more intense.

Example 14

An ink was prepared by milling together 1 part of Yellow H-E-B, 100 parts of the pigment of Example 11 and 200 parts of the vehicle of Example 3. The resulting inks gave bright highly fluorescent yellow films when used in high speed printing.

Example 15

Example 14 was repeated using 2, 3 and 4 parts instead of 1 part of Yellow H-E-B. The resulting inks gave films similar to those obtained from the ink of Example 14 but more intense in color.

Example 16

Example 14 was repeated using 2 and 4 parts of Yellow H-E-B and replacing the vehicle with 200 parts of the heat-set vehicle of Example 10 and 160 parts 95% ethanol. The resulting inks gave bright, highly fluorescent films in high speed printing.

Example 17

Example 16 was repeated replacing the vehicle with 200 parts of No. 1 Transparent Lithographic Varnish and 160 parts of 95% ethanol. The resulting inks gave bright highly fluorescent yellow films in high speed printing.

While the examples illustrate the use of various fluorescent dyes, other fluorescent dyes may be employed. Some of these are listed below.

| Dye | Color Index Number |
|---|---|
| Uranine B-4315 | 766 |
| Flavine TG | 815 |
| Diazo Scarlet PRD | 812 |
| Fluorescent Violet G | 654 |
| Auramine O | 655 |
| Rhodamine B | 749 |
| Acid Rhodamine B | 748 |
| Rhodamine 6G | 752 |
| Brillant Flavine S | 816 |
| 4-beta-hydroxy ethyl amine-1,8-naphthalic acid-N-butyl imide | |
| 3-sulfo-4-amino-1,8-naphthalic acid-N-(4-carboxy methyl phenyl)-imide | |
| 4-amino-1,8-naphthalic acid-N-butyl imide | |
| 4-methyl-7-diethylaminocoumarin-4,4'-di-(orthomethoxy benzidine amino)-stilbene-2,2'-disodium sulfonate | |

Examples of other dyes which have fluorescence are:

4-octadecyl amino-1,8-naphthalic acid-N-amyl imide 4-beta-hydroxy ethyl amino-1,8-naphthalic acid amyl imide 4,4'-di-(ortho methoxy amisoyl)-benzidine sulfone-3,3'-disodium sulfonate 4,4'-(p-diamisoyl)-benzidine sulfone-3,3'-disodium sulfonate 1,1'-diethyl-2,2'-tricarbocyanide iodide 2,2'-diethyl thia tricarbocyanide iodide Eosine—C.I. 768

I claim:

1. A fluorescent printing ink adapted for use in press printing operations which comprises; a press printing vehicle selected from the group consisting of lithographic varnish, and maleic-fumaric-rosin adducts, metal rosinates and shellac dissolved in solvents; a pigment dispersed therein comprising (1) a single phase resinous substrate prepared by (a) forming a mixture comprising a powdered polyacrylonitrile formed by emulsion polymerization of acrylonitrile and a resinous forming monomer selected from the group consisting of urea formaldehyde and melamine formaldehyde and (b) subjecting said mixture to conditions at which said monomer is polymerized whereby said single phase resinous substrate is obtained in powder form, said monomer being in amount of from about 1.5–85% by weight of the polyacrylonitrile, and (2) a fluorescent organic dye solvated in said substrate, the amount of dye being not more than about 4% by weight of the substrate.

2. A method of preparing a fluorescent printing ink suitable for use in press printing operations which comprises: dissolving an organic fluorescent dyestuff in a press printing vehicle selected from the group consisting of lithographic varnish, and maleic-fumaric-rosin adducts, metal rosinates and shellac dissolved in solvents; mixing therewith a powdered resinous substrate, said substrate having been prepared by (a) forming a mixture comprising a powdered polyacrylonitrile formed by emulsion polymerization of acrylonitrile and a resinous forming monomer selected from the group consisting of urea formaldehyde and melamine formaldehyde, and (b) subjecting said mixture to conditions at which said monomer is polymerized whereby a single phase resinous product in powdered form is obtained; said monomer being in amount of from about 1.5–85% by weight of the polyacrylonitrile; the amount of dyestuff being not more than about 4% by weight of the powdered resinous substrate;

and subjecting the resultant mixture of vehicle, dyestuff and substrate to a mixing operation.

References Cited in the file of this patent

UNITED STATES PATENTS

| 2,450,902 | Marberg | Oct. 12, 1948 |
| 2,498,592 | Switzer | Feb. 21, 1950 |
| 2,545,716 | Thompson | Mar. 20, 1951 |
| 2,643,958 | Kleiner | June 30, 1953 |
| 2,663,696 | Armatys | Dec. 22, 1953 |
| 2,678,924 | Graulich | May 18, 1954 |
| 2,809,954 | Kazenas | Oct. 15, 1957 |

FOREIGN PATENTS

| 1,054,009 | France | Oct. 7, 1953 |